United States Patent
Kimura

(10) Patent No.: US 8,457,428 B2
(45) Date of Patent: Jun. 4, 2013

(54) IMAGE CODING APPARATUS, CONTROL METHOD THEREOF, AND STORAGE MEDIUM

(75) Inventor: Makoto Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 13/085,587

(22) Filed: Apr. 13, 2011

(65) Prior Publication Data

US 2011/0262052 A1 Oct. 27, 2011

(30) Foreign Application Priority Data

Apr. 27, 2010 (JP) ................................ 2010-102689

(51) Int. Cl.
*G06K 9/36* (2006.01)
(52) U.S. Cl.
USPC ....................................................... 382/248
(58) Field of Classification Search
USPC .................. 382/232–235, 238–239, 246, 248; 358/426.02, 426.06–426.07, 426.13; 375/240.23–240.24, E7.088, E7.103, E7.144, 375/E7.211, E7.213, E7.226, E7.231; 341/50–51, 59, 65, 67, 106–107; 714/767
See application file for complete search history.

(56) References Cited

U.S. PATENT DOCUMENTS 5,583,500 A * 12/1996 Allen et al. ................... 341/107
5,748,790 A * 5/1998 Golin ........................... 382/246

FOREIGN PATENT DOCUMENTS

JP 2006-157678 A 6/2006

* cited by examiner

*Primary Examiner* — Jose Couso
(74) *Attorney, Agent, or Firm* — Fitzpatrick, Cella, Harper & Scinto

(57) ABSTRACT

Even in a case where there are a plurality of syntax elements, the invention reduces influence of the number of syntax elements and realizes high-speed encoding. An apparatus comprises N number of codes generation units arranged in parallel, which are configured to generate codes, including one or more codes, based on a transform coefficient; N number of first code concatenation units arranged in parallel, each of which is configured to concatenate the codes, respectively generated by the N number of codes generation units, for generating a code stream; N number of storage units arranged in parallel, each of which is configured to store the N number of code streams inputted from the N number of first code concatenation units; and a second code concatenation unit configured to read each of the code streams, which are stored in the N number of storage units, and concatenate the read code streams.

12 Claims, 14 Drawing Sheets

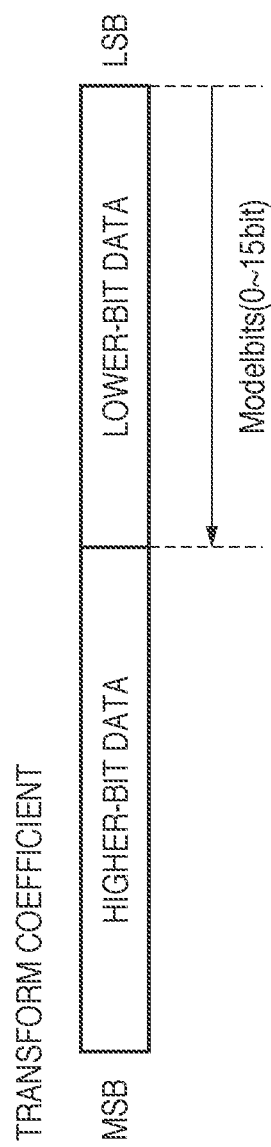

IMAGE CODING APPARATUS, CONTROL METHOD THEREOF, AND STORAGE MEDIUM

BACKGROUND OF THE INVENTION

1. Field of the Invention

The present invention relates to an image data coding technique.

2. Description of the Related Art

In still-image and moving-image encoding, generally, image data is divided into rectangular tiles of a predetermined size, and each of the tiles is further divided into a plurality of macro blocks (MB) of a predetermined size. With the MB as a processing unit of encoding, data constituting the MB is subjected to orthogonal transformation, quantization, and coefficient prediction. After the coefficient prediction is performed, the data is further subjected to scan conversion for converting two-dimensional data to one-dimensional data consisting of a non-zero coefficient (non-zero data) and an zero coefficient (zero data), that is, a coefficient having zero run length. Based on one-dimensional data which has been rearranged in the foregoing manner, a plurality of syntax elements are generated, and each of the syntax elements is subjected to entropy coding. Finally, various codes generated by entropy coding are concatenated in a given order determined by each coding scheme, and code streams are generated.

In the above-described encoding, in which codes are generated respectively from a plurality of syntax elements and concatenated as a code stream, Japanese Patent Laid-Open No. 2006-157678 can be given as a coding apparatus which realizes encoding and concatenation at high speed.

Shown in FIG. 2 is a configuration of an image coding apparatus employing the above-described conventional art. The image coding apparatus comprises a block storage unit 201, N number of syntax element generation units 202-1 to 202-N, N number of code generation units 203-1 to 203-N, N number of variable-length code storage units 204-1 to 204-N, and a code concatenation unit 205.

In the image coding apparatus, transform coefficients are inputted in block unit and temporarily stored in the block storage unit 201. Since the block storage unit 201 has an alternate buffer architecture, which is capable of storing transform coefficients for at least two blocks, reading and writing in block unit can be performed in parallel. The N number of syntax element generation units 202-1 to 202-N generate a plurality of syntax elements in parallel based on the transform coefficients (image data) for one block, which are read out of the block storage unit 201. The N number of code generation units 203-1 to 203-N perform variable-length coding on the N number of generated syntax elements using a coding table. Each code, which has been generated by encoding by the N number of code generation units 203-1 to 203-N, is stored in the N number of variable-length code storage units 204-1 to 204-N according to the type of syntax elements. The code concatenation unit 205 concatenates each of the codes stored in the N number of variable-length code storage units 204-1 to 204-N and generates a code stream. Each of the N number of variable-length code storage units 204-1 to 204-N also has an alternate buffer architecture, which is capable of storing codes for at least two blocks.

The above-described configuration realizes an image coding apparatus, which is capable of pipelining encoding of a plurality of syntax elements and concatenation of respective codes in block unit, as well as high-speed encoding.

However, the image coding apparatus according to the conventional art has a problem in that processing performance of the apparatus depends upon the number of syntax elements. FIG. 3A shows a code storing method of each variable-length code storage unit, which constitutes the N number of variable-length code storage units 204-1 to 204-N. In each variable-length code storage unit, an encoded result (code) of a syntax element is stored in one address. Therefore, assuming that n number of syntax elements are generated by encoding transform coefficients for one block, the generated codes are stored in n number of addresses in the N number of variable-length code storage units 204, regardless of the amount of codes. The code concatenation unit 205 needs to read codes from n number of addresses in the variable-length code storage units 204-1 to 204-N in order to concatenate these codes. In other words, n times of reading must be performed regardless of the code length of each code data. As a result, the more the number of syntax elements (number of codes) in one block, the longer time is required for the code concatenation.

As described above, if the conventional art is applied to the JPEG XR coding scheme for encoding a large number of syntax elements, processing time for code concatenation increases, and thus the apparatus cannot benefit from the effect of encoding.

SUMMARY OF THE INVENTION

The present invention has been made in view of the above-described problem. The present invention provides an image coding technique, which can reduce influence of the number of syntax elements and realize high-speed encoding, even in a case where there are a plurality of syntax elements.

In order to solve the aforementioned problem, for instance, the present invention in its aspect provides an image coding apparatus for frequency-transforming a block constituting an image and generating a code stream based on an obtained transform coefficient, comprising: a plurality of codes generation units arranged in parallel, which are configured to generate codes, including one or more codes, based on the transform coefficient; a plurality of first code concatenation units arranged in parallel, each of which is configured to concatenate each code, constituting the codes generated by the codes generation units, for generating a partial code stream; a plurality of storage units arranged in parallel, each of which is configured to store the partial code stream inputted from the first code concatenation unit; and a second code concatenation unit configured to read the partial code stream, which is stored in each of the plurality of storage units, and concatenate read partial code streams for generating the code stream for output.

According to the present invention, it is possible to further reduce time which is necessary for generating a code stream for a block, constituting an image, based on a transform coefficient obtained by performing frequency transformation on the block, and realize high-speed encoding.

Further features of the present invention will become apparent from the following description of exemplary embodiments (with reference to the attached drawings).

BRIEF DESCRIPTION OF THE DRAWINGS

FIG. 14 is a view showing a coefficient division method in a transform coefficient division unit; and FIG. 15 shows an example of arrangement of coefficients after scan conversion is performed.

DESCRIPTION OF THE EMBODIMENTS

Hereinafter, preferred embodiments of the present invention will be described with reference to the accompanying drawings.

First Embodiment

As an industrially applicable form of the present embodiment, first described is an image processing apparatus having a function for encoding an image and decoding the encoded image. Typical images subjected to encoding include an image read out of an image sensor of a digital camera or a digital camcorder, or an image received through a network. For a typical apparatus, a digital camera or the like may be given as an example.

Figure 4:
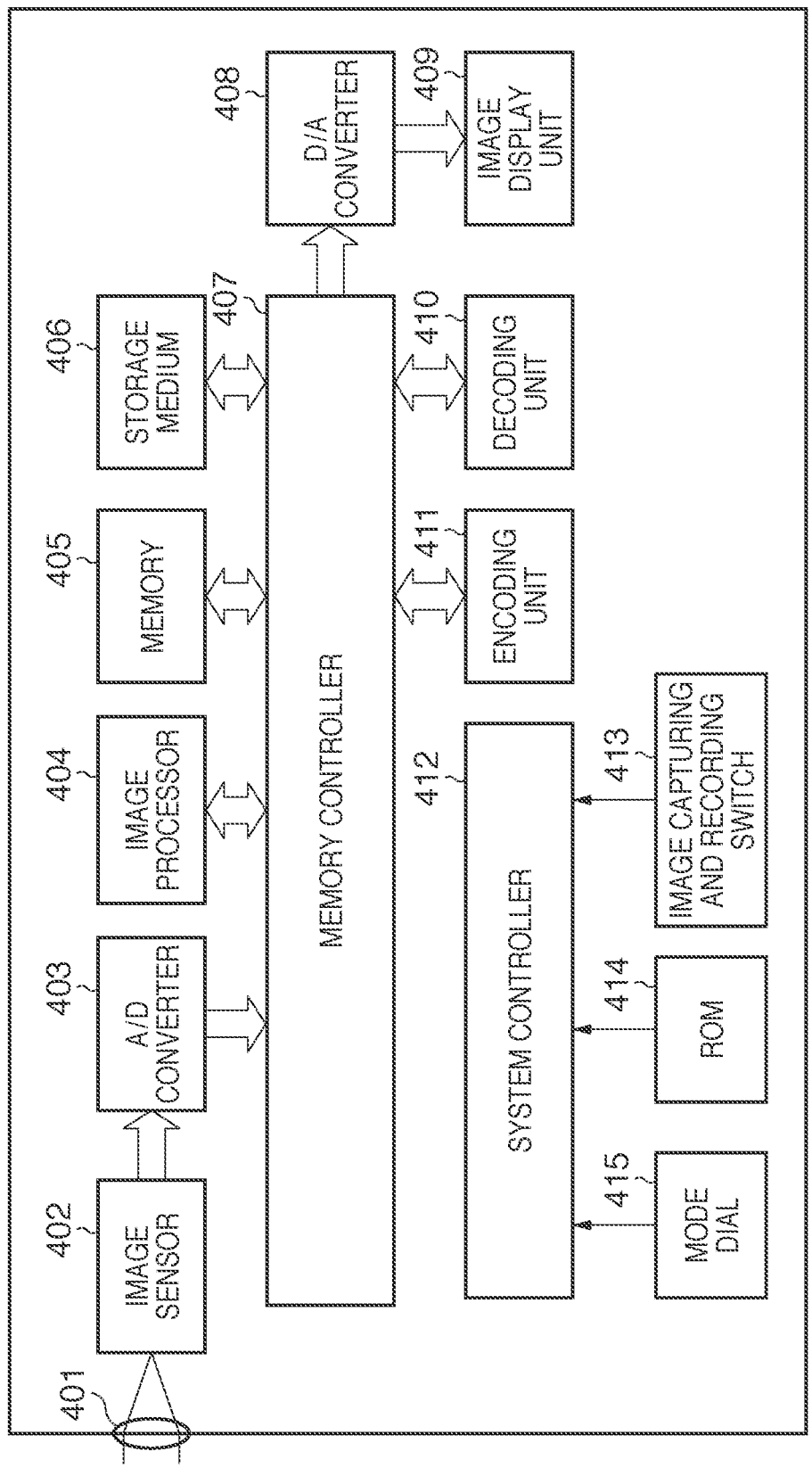
FIG. 4 is a block diagram of a digital camera.

Hereinafter, a digital camera having a configuration shown in FIG. 4 is described as an example. An image of an image-capturing target is formed on an image sensor 402, such as CCD, CMOS sensor or the like, through a lens 401. The image sensor 402 converts the formed image to an analog signal, and transmits the analog signal to an A/D converter 403. The A/D converter 403 converts the analog signal, which has been received from the image sensor 402, to a digital signal. A memory controller 407 acquires, from the A/D converter 403, the converted digital signal as data (image data), and transmits the image data to an image processor 404. The image processor 404 performs well-known image interpolation, color conversion and the like on the image data.

The memory controller 407 acquires the image data, which has been processed by the image processor 404, from the image processor 404, and stores the acquired image data in a memory 405. The memory 405, provided for temporarily storing captured still image data or moving image data, comprises an area for storing a predetermined number of still images (a predetermined number of frames of a moving image). Since the memory 405 can be read or written, the memory controller 407 comprises a plurality of memory control units which are dedicated to data writing of the memory 405, and a plurality of memory control units which are dedicated to data reading of the memory 405.

The image data stored in the memory 405 is again read by the memory controller 407 and transmitted to a D/A converter 408 and an encoding unit 411. The D/A converter 408 converts the image data to an analog signal, and transmits the converted analog signal to an image display unit 409. As a result, an image represented by the analog signal (captured image) is displayed (reproduced) on a screen of the image display unit 409.

Meanwhile, the encoding unit 411 generates a code stream based on the image data (input image), which has been received from the memory controller 407. The memory controller 407 saves the code stream, generated by the encoding unit 411, in a storage medium 406. For the storage medium 406, a medium removable from the image processing apparatus, such as a SD card, is used.

In this case, the digital camera comprises a mode dial 415 for user operation. The mode dial 415 is used for selecting either an image capturing mode or a reproduction mode. When a user selects the image capturing mode by operating the mode dial 415, a system controller 412 controls operation of respective units constituting the image processing apparatus so as to be able to start image capturing. More specifically, an image based on image data of the image obtained through the lens 401 is displayed on the image display unit 409. Furthermore, when an image capturing and recording switch 413 is turned on with the mode dial 415 in the image capturing mode, image capturing is started. More specifically, image data of the image obtained through the lens 401 is encoded, and recorded as a code stream in the storage medium 406.

Meanwhile, when a user selects the reproduction mode by operating the mode dial 415, the system controller 412 controls operation of respective units, constituting the image processing apparatus, so as to realize the following processing.

The memory controller 407 sequentially reads code streams recorded in the storage medium 406 and transmits the read code streams to a decoding unit 410. The decoding unit 410 decodes the code streams received from the memory controller 407. The decoding unit 410 comprises a memory for storing one sheet of decoded image. In the ROM 414, setting data of the image processing apparatus, and a computer program executed by the system controller 412 are stored. Further, in the ROM 414, well-known data of the processing which will be described below are also stored. More specifically, the system controller 412 executes processing with the use of a computer program and data stored in the ROM 414, thereby controlling operation of the respective units of the digital camera. Accordingly, the digital camera according to the present embodiment realizes the processing which will be described below.

Figure 5A:
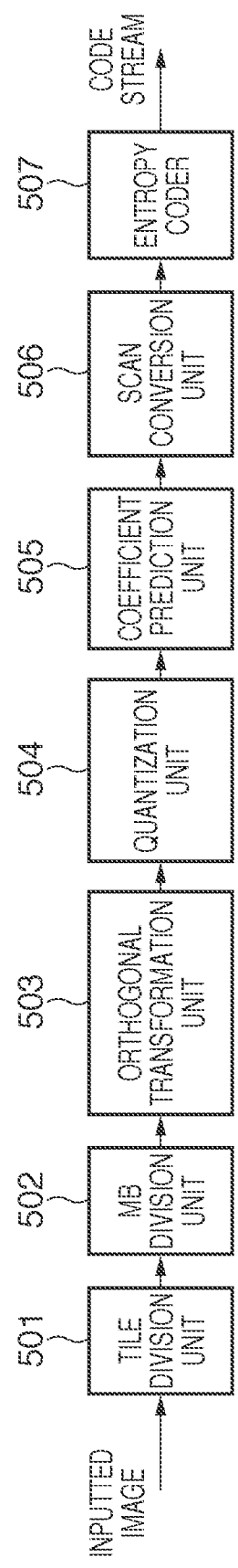
FIGS. 5A and 5B are block diagrams of an image encoding unit and an image decoding unit.

FIG. 5A is a block diagram showing a detailed configuration of functions of the encoding unit 411. Although it is assumed that each function in FIG. 5A is realized by hardware, part or all of them may be realized by a computer program.

When image data for a sheet of image is inputted to the encoding unit 411, a tile division unit 501 divides the inputted image data into one or more tiles, and outputs each tile to a MB division unit 502. The MB division unit 502 divides the inputted one tile data into macro blocks (MB), which becomes a unit of encoding processing. An orthogonal transformation unit 503 performs orthogonal transformation (frequency transformation) on each MB, and outputs the transformed MB. As a result, processing after the orthogonal transformation unit 503 is performed in MB unit. Hereinafter, encoding operation for encoding a MB is described. The similar operation is performed on other MBs.

The orthogonal transformation unit 503 performs orthogonal transformation on the inputted MB data, transforms color space data to a transform coefficient in frequency space, and outputs the data. Further, a quantization unit 504 quantizes the transform coefficient to make the dynamic range of the transform coefficient small. A coefficient prediction unit 505 performs inter-frame prediction or intra-frame prediction, thereby further reducing the intensity of the transform coefficient. The transform coefficient, which has been subjected to quantization and coefficient prediction, is inputted to a scan conversion unit 506 as two-dimensional data. The scan conversion unit 506 scans the two-dimensional transform coefficient for rearranging the transform coefficient to one-dimensional data, which has a higher encoding efficiency, and outputs the one-dimensional data. An entropy coder 507 performs entropy coding on the rearranged one-dimensional data, thereby generating a code stream.

Figure 5B:
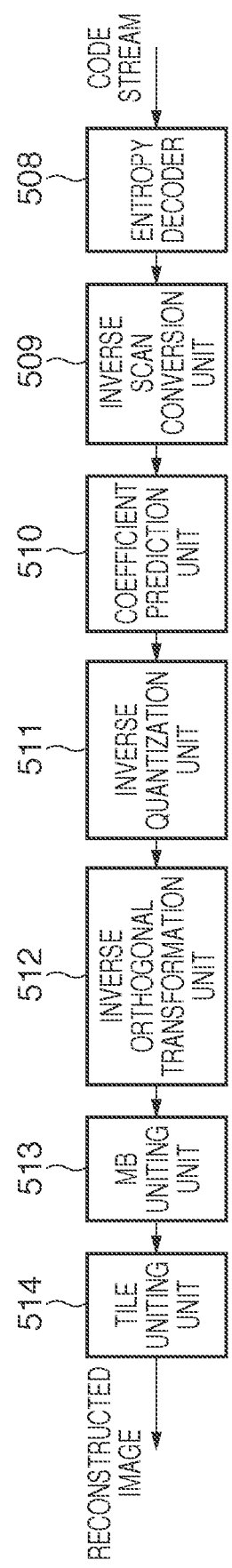

Next, the decoding unit 410 is described with reference to FIG. 5B. Although it is assumed that each function in FIG. 5B is realized by hardware, part or all of them may be realized by a computer program.

A code stream for each image is inputted to the decoding unit 410. An entropy decoder 508 decodes codes of the inputted code stream, and obtains transform coefficient prediction error data. An inverse scan conversion unit 509 performs inverse scan conversion on the decoded transform coefficient prediction error data to obtain two-dimensional scan order from one-dimensional scan order. Next, a coefficient prediction unit 510 adds a predicted error to the transform coefficient prediction error data and obtains a quantized transform coefficient. Thereafter, an inverse quantization unit 511 performs inverse quantization, and an inverse orthogonal transformation unit 512 performs inverse orthogonal transformation respectively, thereby restoring color space data. According to the foregoing processing, MB data can be restored. A MB uniting unit 513 unites each of the MB data to restore a tile. A tile uniting unit 514 unites each tile to restore an image.

By the above-described procedure, the decoding unit 410 reconstructs an image from a code stream, and outputs the reconstructed image to the memory controller 407. Note that, since processing of each unit in the decoding unit is well known, further description will not be provided. The embodiment of the present invention, which will be described below, shows a case in which the present invention realizing high-speed entropy coding is specifically implemented by the aforementioned encoding unit 411.

Figure 1:
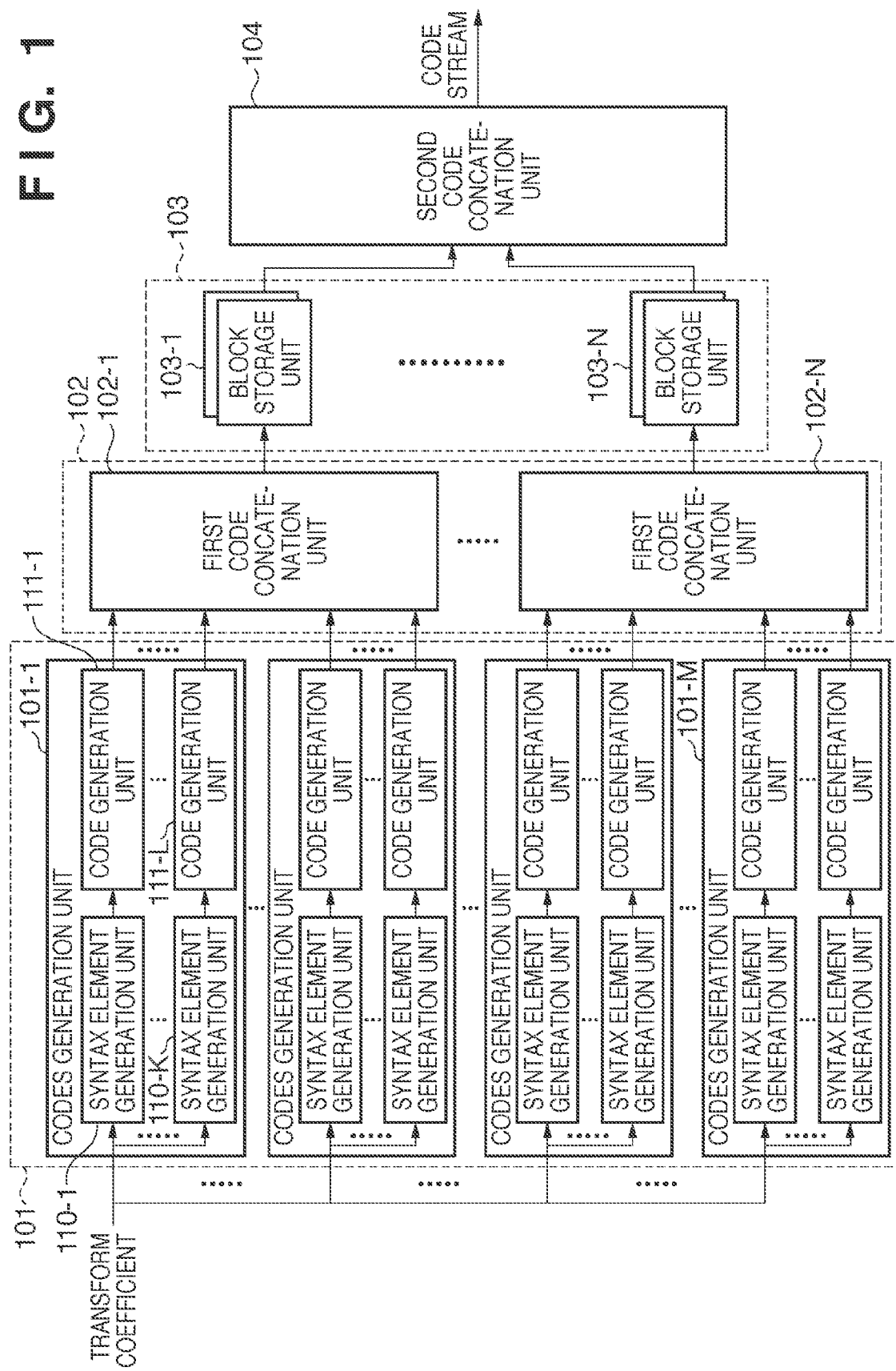
FIG. 1 is a diagram showing a basic configuration of the present invention.

The basic configuration of the entropy coder 507, which is an image coding apparatus employing the present invention, is shown in FIG. 1. As shown in FIG. 1, the entropy coder 507 comprises M number of (M is an integer equal to or larger than 2) codes generation units 101-1 to 101-M which are arranged in parallel. Similarly, the entropy coder 507 comprises N number of first code concatenation units 102-1 to 102-N, which are arranged in parallel, and N number of storage units 103-1 to 103-N. Further, the entropy coder 507 comprises a second code concatenation unit 104. The codes generation unit 101-1 consists of K number of (K is an integer equal to or larger than 1) syntax element generation units 110-1 to 110-K and L number of code generation units 111-1 to 111-L. Note that K=L does not necessarily stand. The codes generation units 101-2 to 101-M also have a similar configuration. The codes generation units 101-1 to 101-M are capable of parallel execution. Also, the first code concatenation units 102-1 to 102-N are capable of parallel execution. Note that each of the codes generation units 101-1 to 101-M does not necessarily have the same number of syntax element generation units and code generation units. However, for ease of explanation, assume in FIG. 1 that the number of syntax element generation units and the number of code generation units which constitute each of the codes generation units 101-1 to 101-M are the same. In the following description, one of the M number of codes generation units 101-1 to 101-M will be referred to as a codes generation unit 101, unless otherwise specified. This also applies to the first code concatenation unit 102 and the storage unit 103. Furthermore, a code stream, which is concatenated in a predetermined unit by the first code concatenation unit 102, will be referred to as a partial code stream.

Each syntax element generation unit in the codes generation unit 101 generates a syntax element, which is subjected to encoding, and outputs the generated syntax element to the corresponding code generation unit. Each code generation unit outputs variable-length code data (code) to the first code concatenation unit 102 using a code table.

The first code concatenation unit 102 concatenates a plurality of code data (codes), outputted by at least one of the codes generation units 101, generates a partial code stream, and outputs the partial code stream to the storage unit 103 for storage. The storage unit 103 has an alternate buffer architecture, in which storage areas switch alternately between writing and reading. Therefore, while the first code concatenation unit 102 is storing the concatenated partial code stream in the storage unit 103, the second code concatenation unit 104 can read concatenated partial code stream of the previous block.

Herein, assume that the total bit number of a partial code stream concatenated by the first code concatenation unit 102 is m, and the number of bits that can be stored in an address of the storage unit 103 is W. In this case, in order to read all the partial code streams (all coded data) stored in the storage unit 103, the second code concatenation unit 104 needs to perform reading for the number of times acquired by the following equation (1):

$$\lceil (m/W) \rceil \quad (1)$$

(herein, $\lceil x \rceil$ indicates an operation symbol which returns the minimum integer at real number x or more)

The second code concatenation unit 104 reads partial code streams stored respectively in the storage units 103-1 to 103-N, and generates a code stream for output. Therefore, the total number of times of reading, which is performed by the second code concatenation unit 104, is the sum of the number of reading times, which is determined by equation (1) with respect to each of the storage units 103-1 to 103-N. In other words, the number of times of reading from the N number of storage units 103-1 to 103-N, performed by the second code concatenation unit 104, does not depend on the number of syntax elements (number of codes), but depends on the amount of codes in the partial code streams respectively stored in the storage units 103-1 to 103-N.

Figure 2:
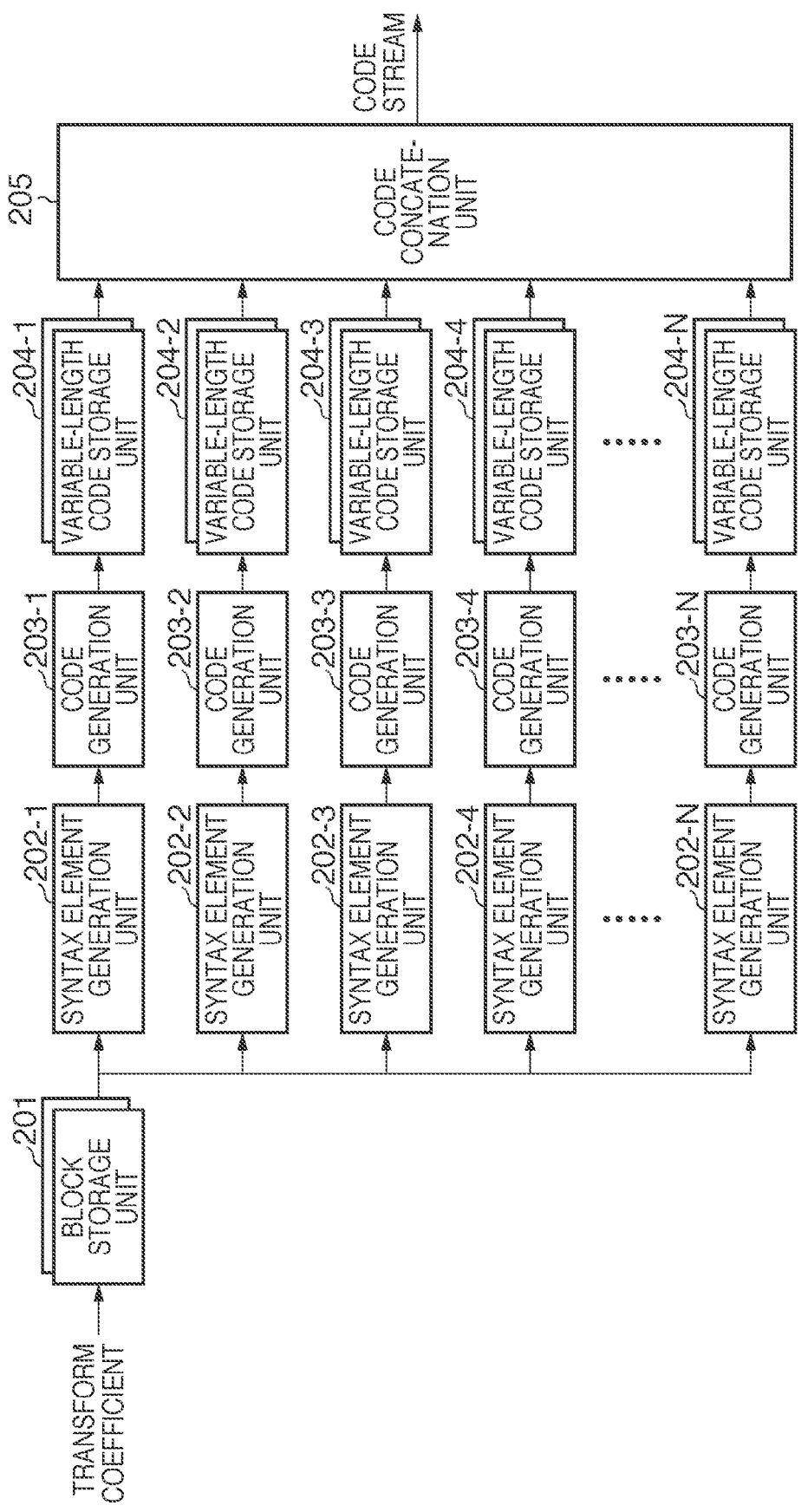
FIG. 2 is a diagram of an image coding apparatus to which a conventional art is applied.

The foregoing description is explained in an easy-to-understand manner, while FIG. 1 is compared with FIG. 2. For ease of explanation, the description herein is provided assuming that M=N=4. Further, each codes generation unit is described, assuming that K=L=4.

In this condition, assume that there are 16 syntax element generation units in FIG. 2. Also assume that there are 16 syntax elements which are generated based on transform coefficients for one block.

Codes are stored respectively in the variable-length code storage units 204-1 to 204-16. The code concatenation unit 205 needs to read codes (coded data) from each of the variable-length code storage units 204-1 to 204-16; therefore, the number of times of accesses required for reading the data is 16 times. In other words, in the case of this configuration in FIG. 2, in order to generate a code stream for one block, it is necessary to take time corresponding to "16" times of reading, that is, the number of syntax elements which is irrespective of the code-length of each code.

Meanwhile, under the same condition, in the configuration in FIG. 1, one codes generation unit 101 consists of 4 pairs of syntax element generation units and code generation units (in a case of K=L=4), and there are 4 first code concatenation units 102 (in a case of M=N=4). Since the first code concatenation units 102-1 to 102-4 respectively concatenate codes in parallel, each concatenation processing takes, at most, time corresponding to four times of reading. Furthermore, time required for writing depends on the amount of codes to be concatenated, and does not depend on the number of codes. The second code concatenation unit 104 reads partial code streams stored in the storage units 103-1 to 103-4, generates a final stream by concatenating the partial code streams, and outputs the final stream. Time required for this processing depends on the amount of codes stored in the storage units 103-1 to 103-4, irrespective of the number of syntax elements (number of codes). Note that while the second code concatenation unit 104 is performing concatenation processing, the codes generation units 101-1 to 101-4 and the first code concatenation units 102-1 to 102-4 are able to perform encoding and concatenation processing of the next block's syntax elements. In other words, time required for concatenation processing of the second code concatenation unit 104 can be absorbed by the processing time of the codes generation units 101-1 to 101-4 and the processing time of the first code concatenation units 102-1 to 102-4.

Figure 6:
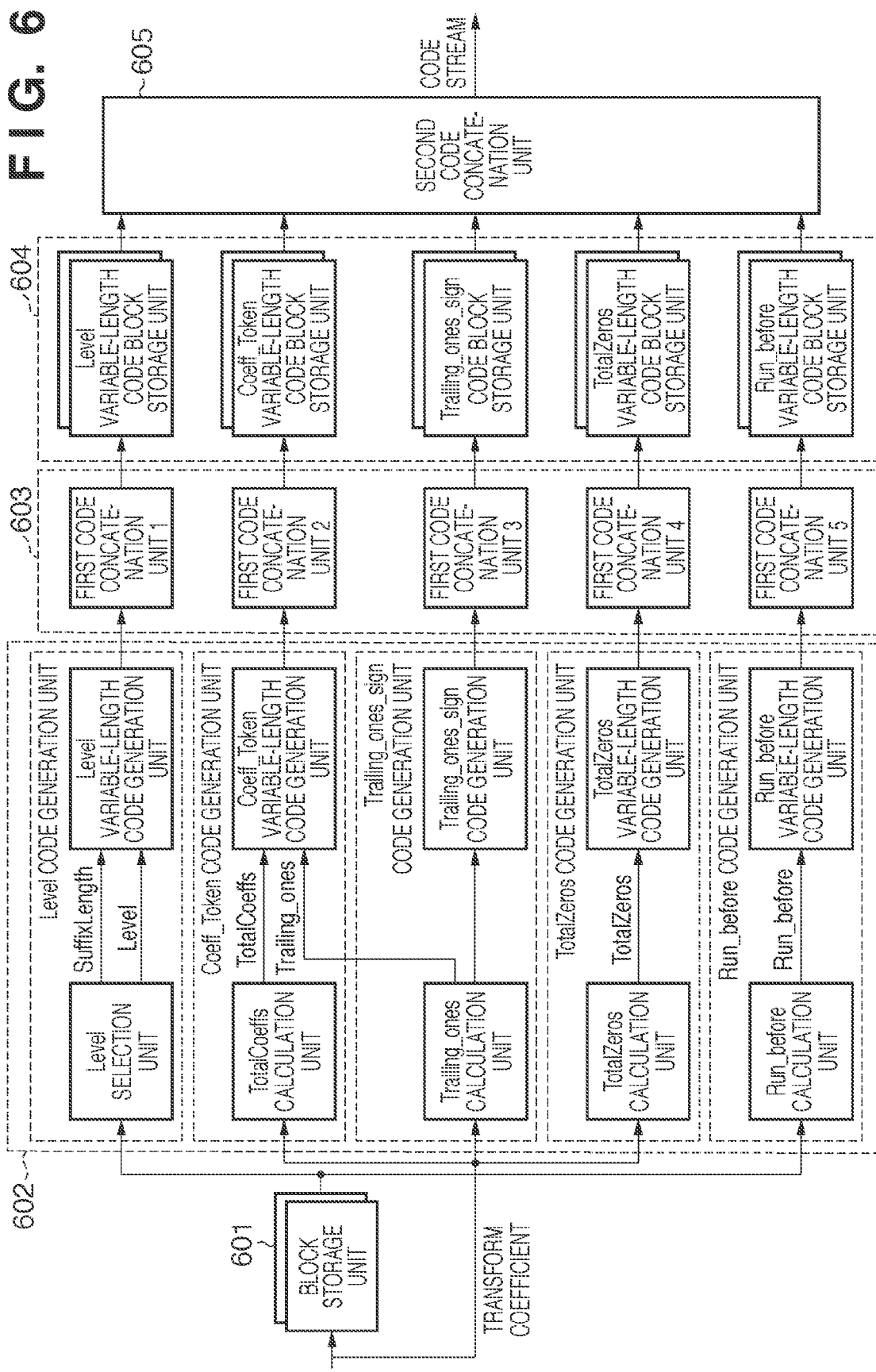
FIG. 6 is a block diagram of a H.264 entropy coding apparatus according to the first embodiment of the present invention.

FIG. 6 shows a configuration in which the present embodiment is applied to entropy coding according to the H.264 coding scheme (CAVLC scheme). FIG. 6 corresponds to the configuration of FIG. 1 where M=5 and N=5 stand. In each of the five codes generation units, K=1 and L=1 stand.

An inputted transform coefficient is first stored in a block storage unit 601 in block unit. A code generation unit 602 generates syntax elements for coding, using the inputted transform coefficient and a transform coefficient which has already been stored in the block storage unit 601. There are five syntax elements generated by the code generation unit 602: Level, Coeff_Token, Trailing_ones_sign (Trailing Ones Sign flag), TotalZeros, and run_before. Since a generation method of each syntax element is disclosed in detail in Japanese Patent Laid-Open No. 2006-157678, descriptions are not provided herein.

A first code concatenation unit 603 concatenates respective codes generated by the code generation unit 602 for each type of syntax element, and generates a partial code stream for each syntax element.

A variable-length code block storage unit 604 stores, in block unit, five partial code streams for respective syntax elements, which have been concatenated by the first code concatenation unit 603.

A second code concatenation unit 605 sequentially reads, in block unit, the partial code streams for respective syntax elements, which have been stored in the variable-length code block storage unit 604, concatenates the partial code streams, and outputs a code stream.

An operation of the second code concatenation unit 605 is described with reference to the flowchart in FIG. 7.

For ease of explanation, the following description is provided assuming that code streams of the k-th and (k+1)th blocks respectively correspond to block code streams of the Coeff_Token variable-length code and the Trailing_ones_sign variable-length code. Note herein that, although both of the partial code streams are obtained by encoding the same block, since they are stored in different storage areas, it is assumed in the following description of FIG. 7 that they are separate blocks (k-th block and (k+1)th block).

When code stream concatenation is started, the second code concatenation unit 605 acquires a code stream, which has been concatenated in advance, from the Coeff_Token variable length code block storage unit of the variable-length code block storage unit 604 (S101). Next, it is determined whether or not the acquired partial code stream is the last partial code stream of the Coeff_Token variable-length code (S102). If the partial code stream is not the last partial code stream of the Coeff_Token variable-length code (NO), the acquired streams are concatenated (S103), and a partial code stream is acquired again from the Coeff_Token variable-length code block storage unit.

Figure 3:
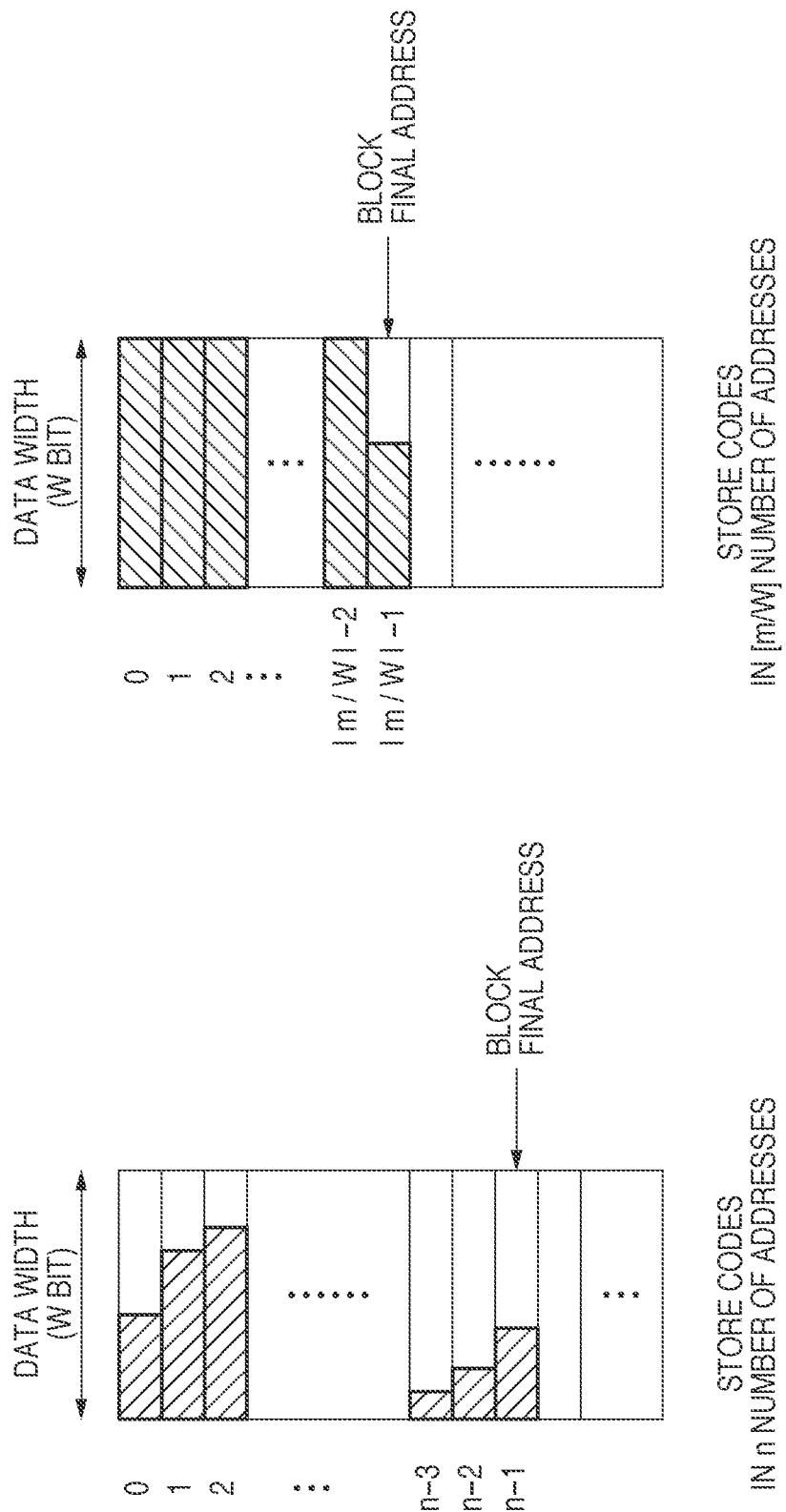
FIGS. 3A and 3B are views showing how code data are stored.

If the determination result in S102 is YES, it is determined whether or not the code stream is of the last block (S104). If the determination result in S104 is NO, it is determined whether or not the next acquired partial code stream is equal to the data width (data width W in FIG. 3) (S108). If the determination result is NO, the acquisition destination of the partial code stream is changed from the Coeff_Token variable-length code block storage unit to the Trailing_ones_sign variable-length code block storage unit (S105). Further, the first partial code stream of the Trailing_ones_sign variable-length code is acquired from the Trailing_ones_sign variable-length code block storage unit (S106). Last, the last partial code stream of the Coeff_Token variable-length code which has already been acquired is concatenated with the first partial code stream of the Trailing_ones_sign variable-length code (S103).

If the determination result in S108 is YES, the acquisition destination of the partial code stream is changed from the Coeff_Token variable-length code block storage unit to the Trailing_ones_sign variable-length code block storage unit (S109). Thereafter, the last partial code stream of the Coeff_Token variable length code which has been acquired is concatenated (S110).

If the determination result in S104 is YES, the control proceeds to step S107, where the last partial code stream which has been acquired is concatenated and outputted. Then, the concatenation processing ends.

Herein, each variable-length code block storage unit, which constitutes the variable-length code block storage unit 604, has a capacity that can store at least two blocks of partial code streams. In the case where the storage unit is capable of storing two blocks of partial code streams, the partial code stream storage areas are constructed with an alternate buffer architecture which is capable of switching the storage areas in block unit. Since the storage unit has an alternate buffer architecture, reading and writing in the block storage unit can be performed in parallel.

Figure 7:
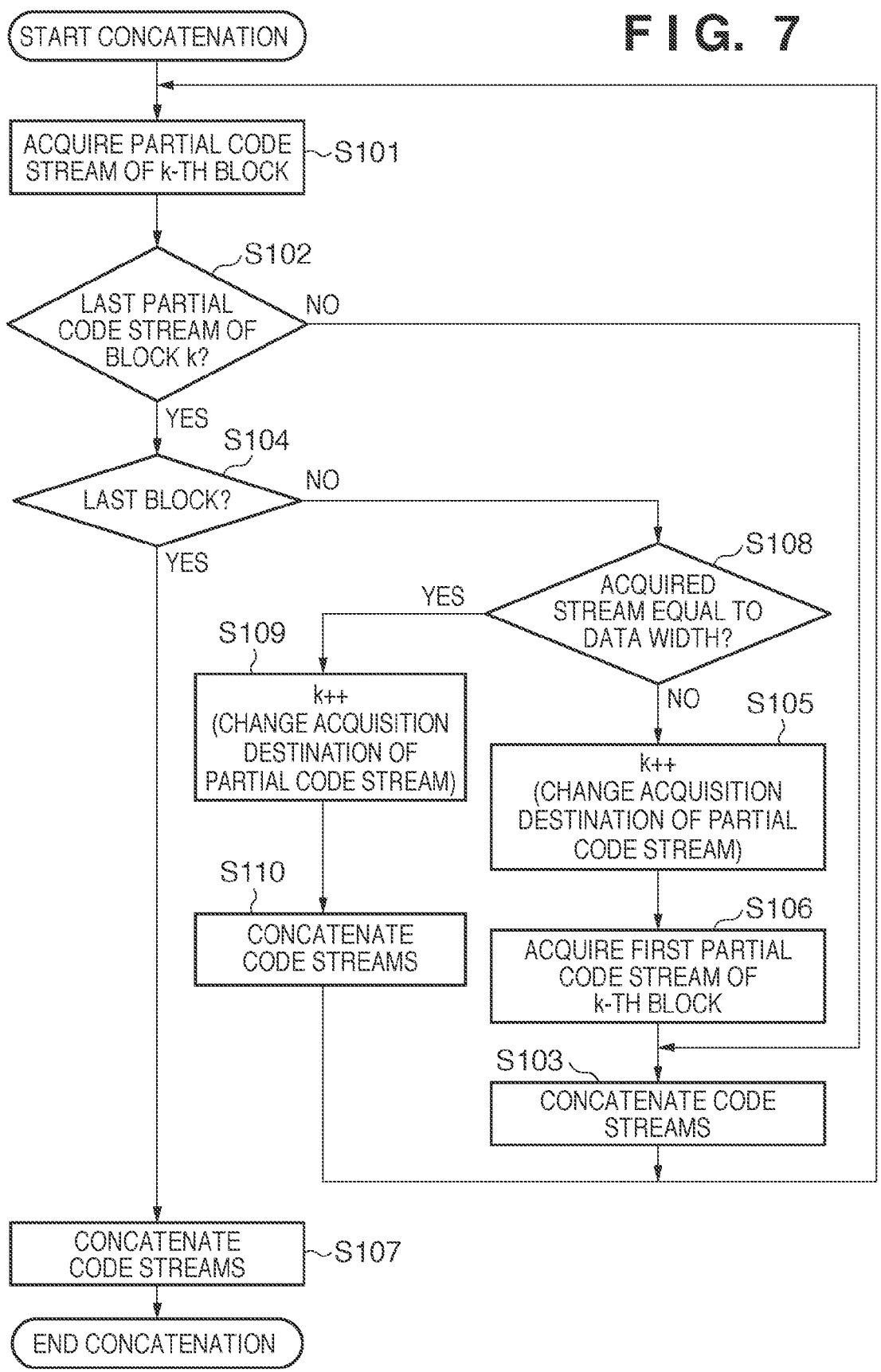
FIG. 7 is a flowchart describing code concatenation processing of a second code concatenation unit.
Figure 8:
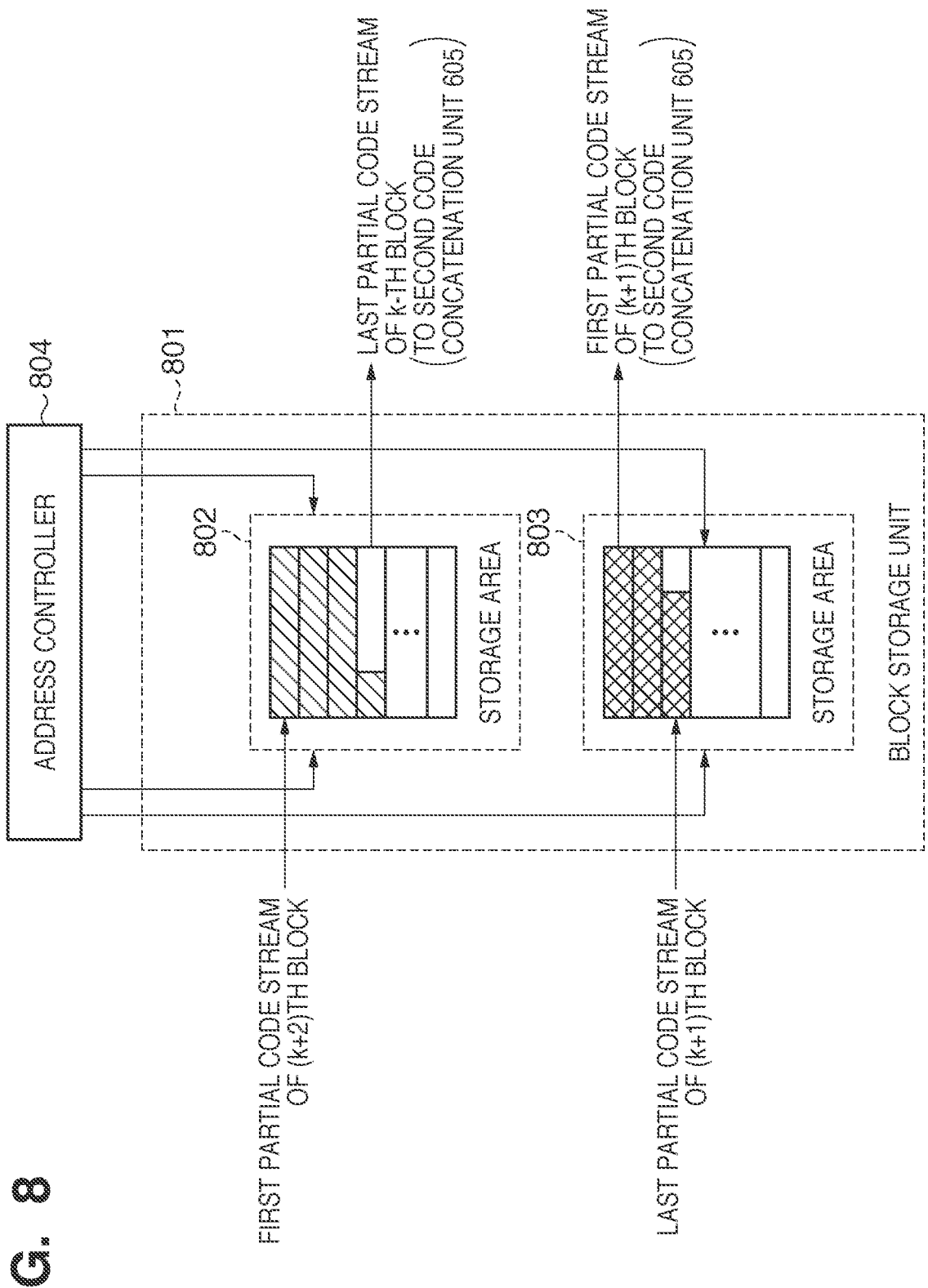
FIG. 8 is a block diagram of a block storage unit.

FIG. 8 shows a configuration in which each block storage unit constituting the variable-length code block storage unit 604 has a storage capacity for two blocks or more. The configuration in FIG. 8 enables acquisition of partial code stream of the (k+1)th block from the same variable-length code block storage unit in S101 in FIG. 7. The block storage unit has a storage capacity for two blocks.

The block storage unit 801 corresponds to each block storage unit (e.g., LEVEL variable-length code block storage unit) of the variable-length code block storage unit 604, and has two reading ports and two writing ports. Each of the storage areas 802 and 803 stores partial code streams for one block. In the storage areas 802 and 803, partial code streams of the k-th and (k+1)th blocks are respectively stored. Address control of reading and writing is performed by an address controller 804.

The address controller 804 simultaneously performs writing and reading control of the two storage areas. Therefore, in a case of outputting the last partial code stream of the k-th block from the storage area 802, the first partial code stream of the (k+1)th block can also be outputted from the storage area 803.

In the foregoing manner, in the processing of S101 in FIG. 7, the second code concatenation unit 605 can acquire both the last partial code stream of the k-th block and the first partial code stream of the (k+1)th block.

Although the storage unit in FIG. 8 has a storage capacity for two blocks, this is merely an example, and the embodiment can be applied to a case where a storage unit has a capacity for two blocks or more.

Second Embodiment

Next described as a second embodiment is a case where the present invention is applied to entropy coding according to the JPEG XR coding scheme.

Figure 12:
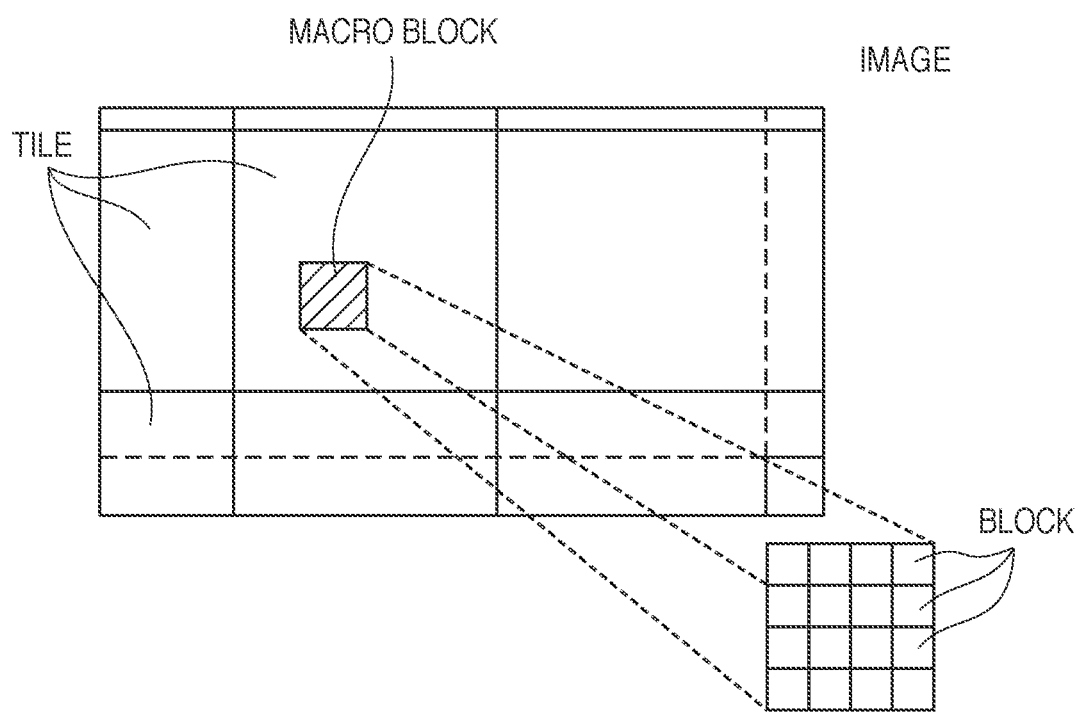
FIG. 12 is a view showing a JPEG XR macro block and block division method.

According to entropy coding of the JPEG XR coding scheme, a transform coefficient on which coefficient prediction has been performed is divided into higher-bit data and lower-bit data. While variable-length coding is performed on the higher-bit data, the lower-bit data is processed (fixed-length coding) as fixed-length data (is also referred to as a fixed-length code, FLEXBITS). In the JPEG XR coding scheme, a MB is further divided into smaller blocks, and coding is performed in units of these blocks (FIG. 12). Further, code streams are defined (FIG. 13) for alternately inserting a variable-length code (VLC in FIG. 13) and a fixed-length code (FLC in FIG. 13) in block unit (Block in FIG. 13).

Figure 9:
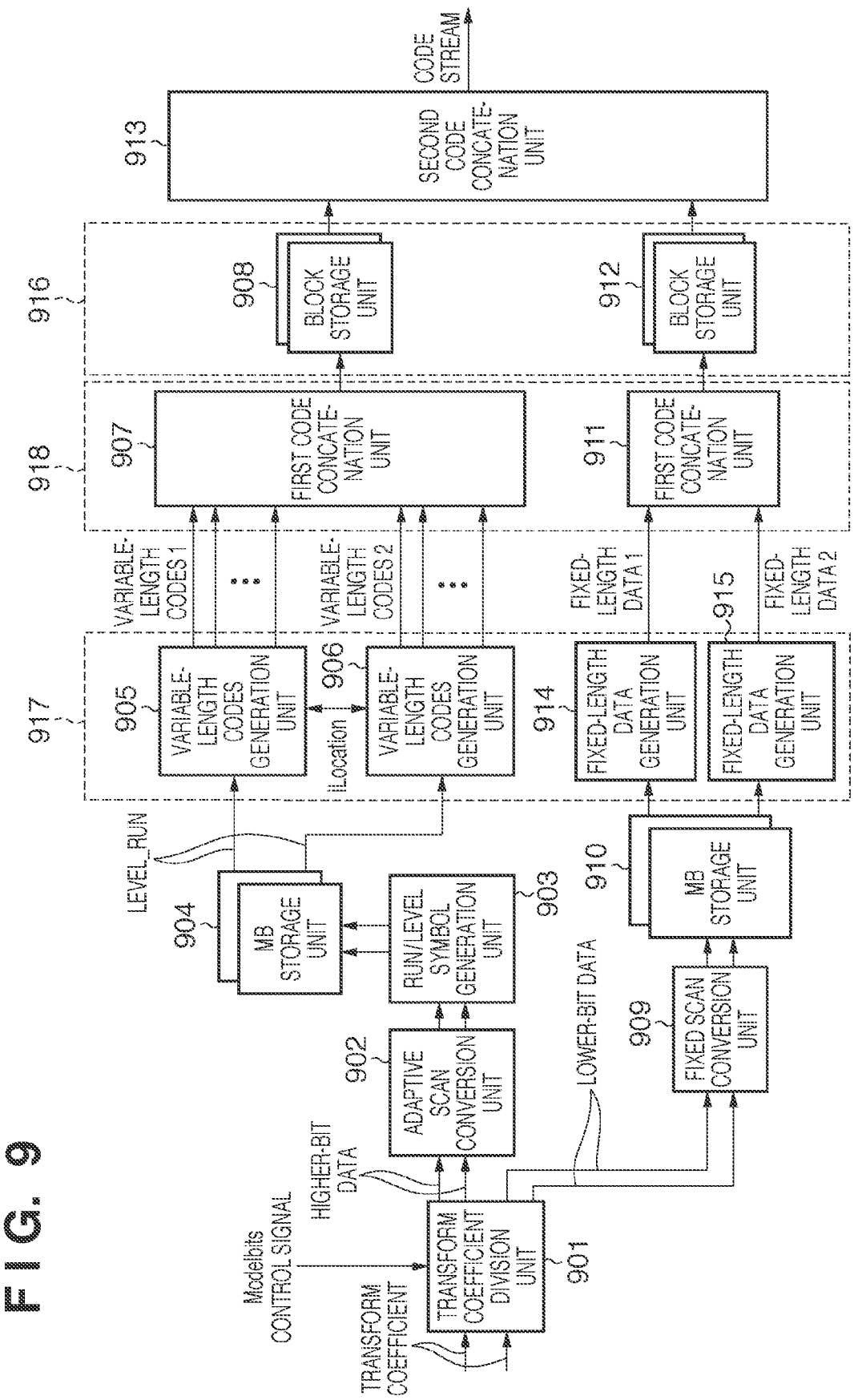
FIG. 9 is a block diagram of JPEG XR entropy coding according to the second embodiment.

The second embodiment is shown in FIG. 9. The second embodiment has a configuration of FIG. 1, where M=4 and N=2. The four codes generation units consist of two variable-length codes generation units 905 and 906, and two fixed-length data generation units 914 and 915. In the two variable-length codes generation units 905 and 906, K=7 and L=10 stand. In the two fixed-length data generation units 914 and 915, K=1 and L=1 stand.

In FIG. 9, a codes generation unit 917 corresponds to the M number of codes generation unit 101 in FIG. 1. A first code concatenation unit 918 corresponds to the N number of first code concatenation unit 102. A storage unit 916, consisting of two block storage units 908 and 912, corresponds to the N number of storage units 103 in FIG. 1.

To a transform coefficient division unit 901, one or two transform coefficients constituting a block are simultaneously inputted and stored. In the transform coefficient division unit 901, the transform coefficient is divided into lower-bit data expressed by lower bits of the bit number indicated by a Modelbits control signal, and higher-bit data expressed by higher bits, which are higher than the lower bits (FIG. 14). Note that the number of bits indicated by a Modelbits control signal is between 0 and 15. If the number of bits is 0, the inputted transform coefficient is not divided, and all is processed as higher-bit data.

Among the divided transform coefficients, higher-bit data is subjected to scan conversion by an adaptive scan conversion unit 902, in which scan order is updated in block unit. A RUN/LEVEL symbol generation unit 903 generates a RUN symbol and a LEVEL symbol, and stores them in a MB storage unit 904. The MB storage unit 904 has a capacity for storing at least two or more MB data, and has an alternate buffer architecture. Therefore, reading and writing in the MB storage unit 904 can be performed in parallel. A variable-length codes generation unit 905 reads RUN/LEVEL symbols from the MB storage unit 904, generates a plurality of syntax elements based on the two symbols, encodes them, and outputs them as codes. The variable-length codes generation unit 906 operates similarly.

The variable-length codes generation units 905 and 906 are capable of processing two RUN/LEVEL symbols in the same block in parallel. For instance, while the variable-length codes generation unit 905 processes odd-numbered RUN/LEVEL symbols of a block, the variable-length codes generation unit 906 processes even-numbered RUN/LEVEL symbols of the block.

Figure 10:
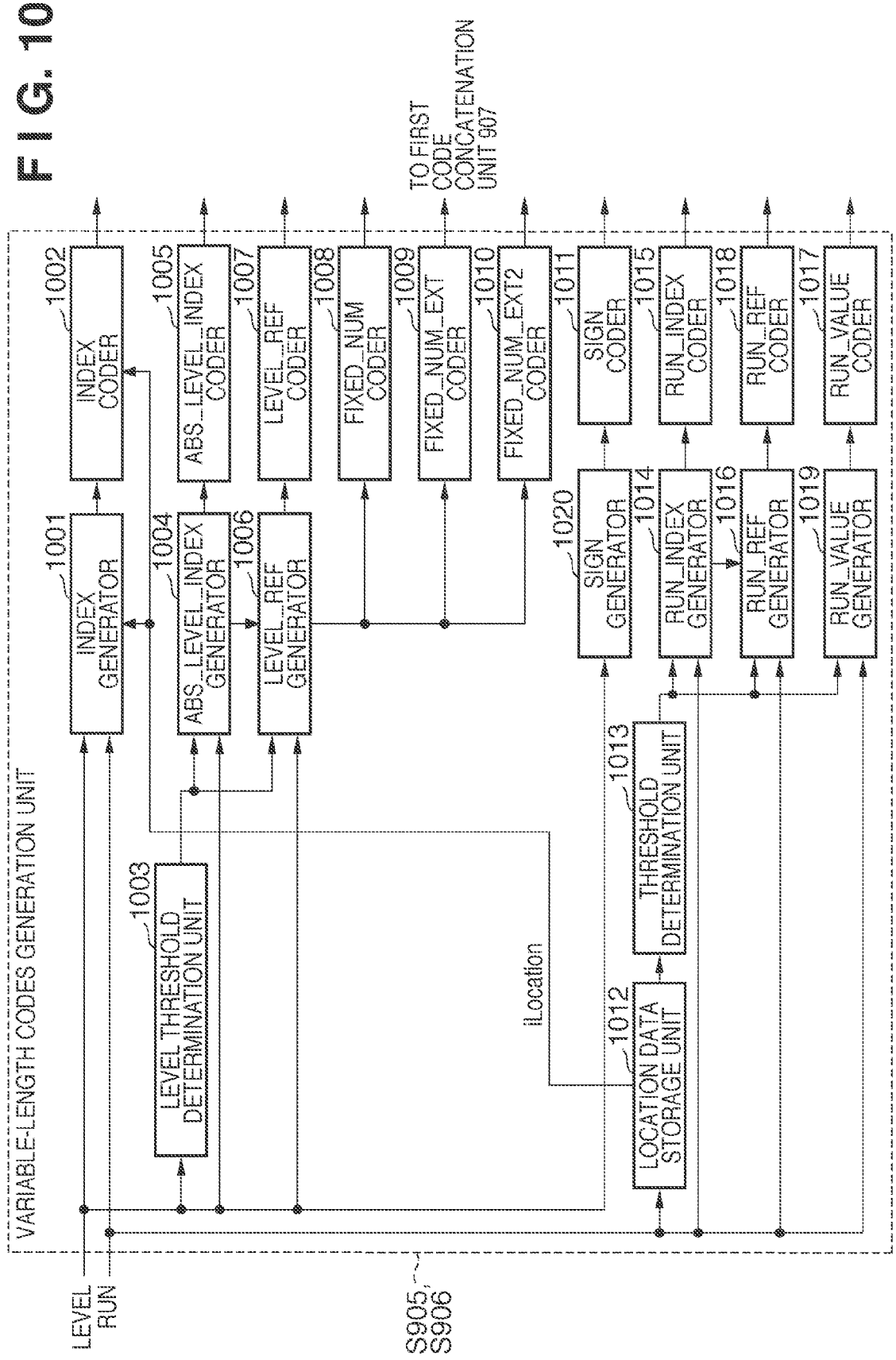
FIG. 10 is a block diagram of a variable-length codes generation unit.

FIG. 10 shows an internal configuration of the variable-length codes generation unit 905. Note that the variable-length codes generation unit 906 also has a similar configuration. In FIG. 10, an INDEX generator 1001 generates index data from RUN/LEVEL symbols and outputs it. An INDEX coder 1002 performs variable-length coding on the index data, using a corresponding coding table, and outputs the code. A LEVEL threshold determination unit 1003 in FIG. 10 compares an absolute value of the LEVEL with a threshold, and outputs the determination result. A syntax element, which will be generated in the later processing, is decided in accordance with the determination result of the LEVEL threshold determination unit 1003. In a case of 2≦LEVEL<threshold, an ABS_LEVEL_INDEX generator 1004 generates a reference value (index value) for the LEVEL; whereas in a case of LEVEL≧threshold, the ABS_LEVEL_INDEX generator 1004 generates an escape code. An ABS_LEVEL_INDEX coder 1005 performs variable-length coding on the output of the ABS_LEVEL_INDEX generator 1004, using a corresponding coding table. In a case of LEVEL<threshold, a LEVEL_REF generator 1006 generates an addition bit to be added to the index value, which has been generated by the ABS_LEVEL_INDEX generator 1004. If LEVEL≧threshold, an addition bit is generated based on LEVEL. A LEVEL_REF coder 1007 outputs the addition bit, which has been generated by the LEVEL_REF generator 1006, as a code. In this stage, the addition bit length is transmitted to a FIXED_NUM coder 1008, a FIXED_NUM_EXT coder 1009, and a FIXED_NUM_EXT2 coder 1010. The FIXED_NUM coder 1008, the FIXED_NUM_EXT coder 1009, and the FIXED_NUM_EXT2 coder 1010 encode the addition bit length only when LEVEL≧threshold stands. A SIGN generator 1020 outputs a code bit corresponding to positive or negative of the non-zero coefficient, and a SIGN coder 1011 outputs the code bit as a code.

Further, RUN encoding is described with reference to FIG. 10. A location data (iLocation) storage unit 1012 stores data indicative of RUN start location (iLocation) in one-dimensional data which is rearranged by the adaptive scan conversion unit 902. For instance, assuming that the coefficients after scan conversion have an arrangement shown in FIG. 15, in a case where RUN (=4) which is subsequent to non-zero coefficient 9 is to be encoded, iLocation 7 is obtained. After the RUN is encoded, the location data storage unit 1012 further updates iLocation by equation (2).

$$i\text{Location} = i\text{Location} + \text{RUN} + 1 \qquad (2)$$

A threshold determination unit 1013 compares non-updated iLocation with a threshold, and selects a syntax element, which will be generated in the later processing, in accordance with the determination result. In a case of iLocation≦threshold, a RUN_INDEX generator 1014 generates an index value for RUN, and a RUN_INDEX coder 1015 encodes the index value and outputs a code. A RUN_REF generator 1016 generates an addition bit for the index value, which has been generated by the RUN_INDEX generator 1014. A RUN_REF coder 1018 outputs the addition bit, which has been generated by the RUN_REF generator 1016, as a code. In this stage, a RUN_VALUE coder 1017 does not perform encoding. In a case of iLocation>threshold, the RUN_INDEX coder 1015 and the RUN_REF coder 1018 do not perform encoding. Instead, a RUN_VALUE generator 1019 generates data in accordance with the location data and the RUN value, and the RUN_VALUE coder 1017 selects an appropriate coding table for encoding the data.

In the foregoing manner, the variable-length codes generation units 905 and 906 in FIG. 9 respectively output up to 10 types of codes to the first code concatenation unit 907 simultaneously.

Next, encoding lower-bit data is described with reference to FIG. 9. Lower-bit data of the transform coefficient, which has been divided by the Modelbits control signal, is supplied to the fixed scan conversion unit 909. The fixed scan conversion unit 909 performs scan conversion on the lower-bit data. To the fixed scan conversion unit 909, one or two lower-bit data of the transform coefficient constituting a block are simultaneously inputted. The data rearranged by the fixed scan conversion unit 909 is stored in the MB storage unit 910. As similar to the MB storage unit 904, the MB storage unit 910 has an alternate buffer architecture, which has a capacity for storing data for at least two MBs, and is capable of reading and writing in parallel. The fixed-length data generation units 914 and 915 read the lower-bit data out of the MB storage unit 910. If higher-bit data corresponding to the read lower-bit data is 0 (FIG. 14), the fixed-length data generation units 914 and 915 add a code bit indicative of positive or negative to the lower-bit data, and transmits the fixed-length data to the first code concatenation unit 911. If higher-bit data is not 0, the lower-bit data is transmitted as fixed-length data to the first code concatenation unit 911.

Figure 13:
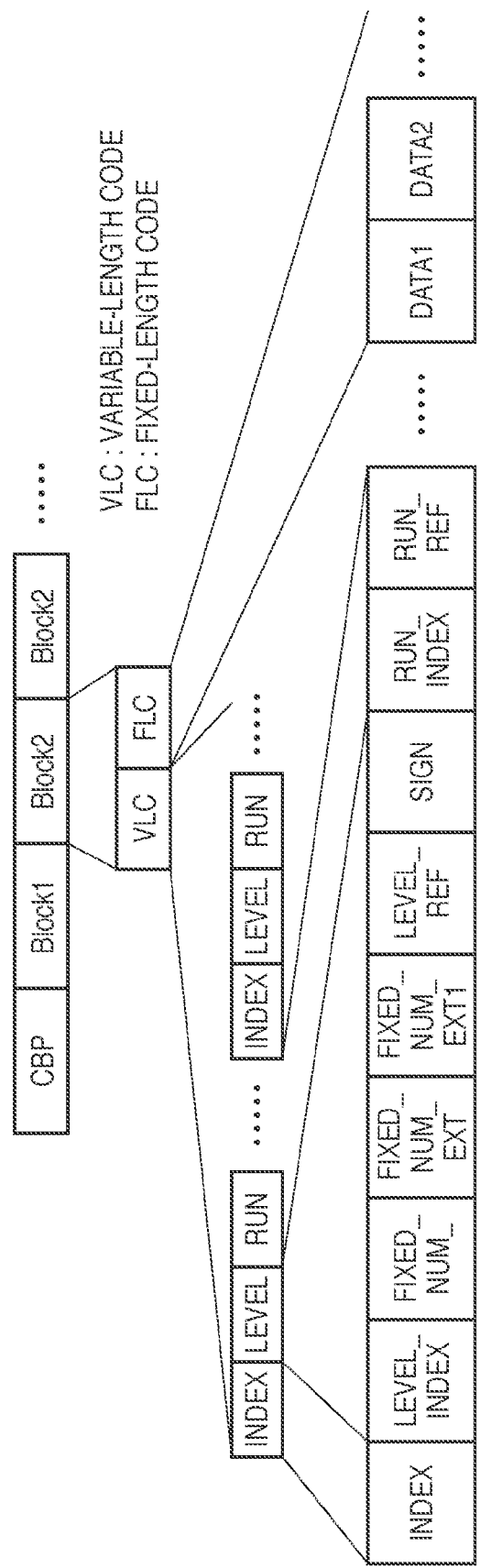
FIG. 13 is a view showing a configuration of a JPEG XR code stream.

Code concatenation in the first code concatenation units 907 and 911 is described with reference to FIG. 9. The first code concatenation unit 907 concatenates codes, which have been outputted by the variable-length codes generation units 905 and 906, for generating a code stream for each block. The concatenation order of each code is shown in FIG. 13. The first code concatenation unit 911 concatenates the output of the fixed-length data generation units 914 and 915, and generates a partial code stream for each block. The concatenation order of each code is also shown in FIG. 13. In FIG. 13, the fixed-length data is expressed in the order of inputting data to the first code concatenation unit 911: "DATA1", "DATA2"... "DATA15".

The partial code streams, outputted by the first code concatenation units 907 and 911, are stored in the block storage units 908 and 912. Since the storage method of the block storage units 908 and 912 have already been described in FIG. 3B, descriptions thereof are omitted. The block storage units 908 and 912 may be constructed with an alternate buffer architecture as similar to the first embodiment, or may be of the one shown in FIG. 8.

Figure 11:
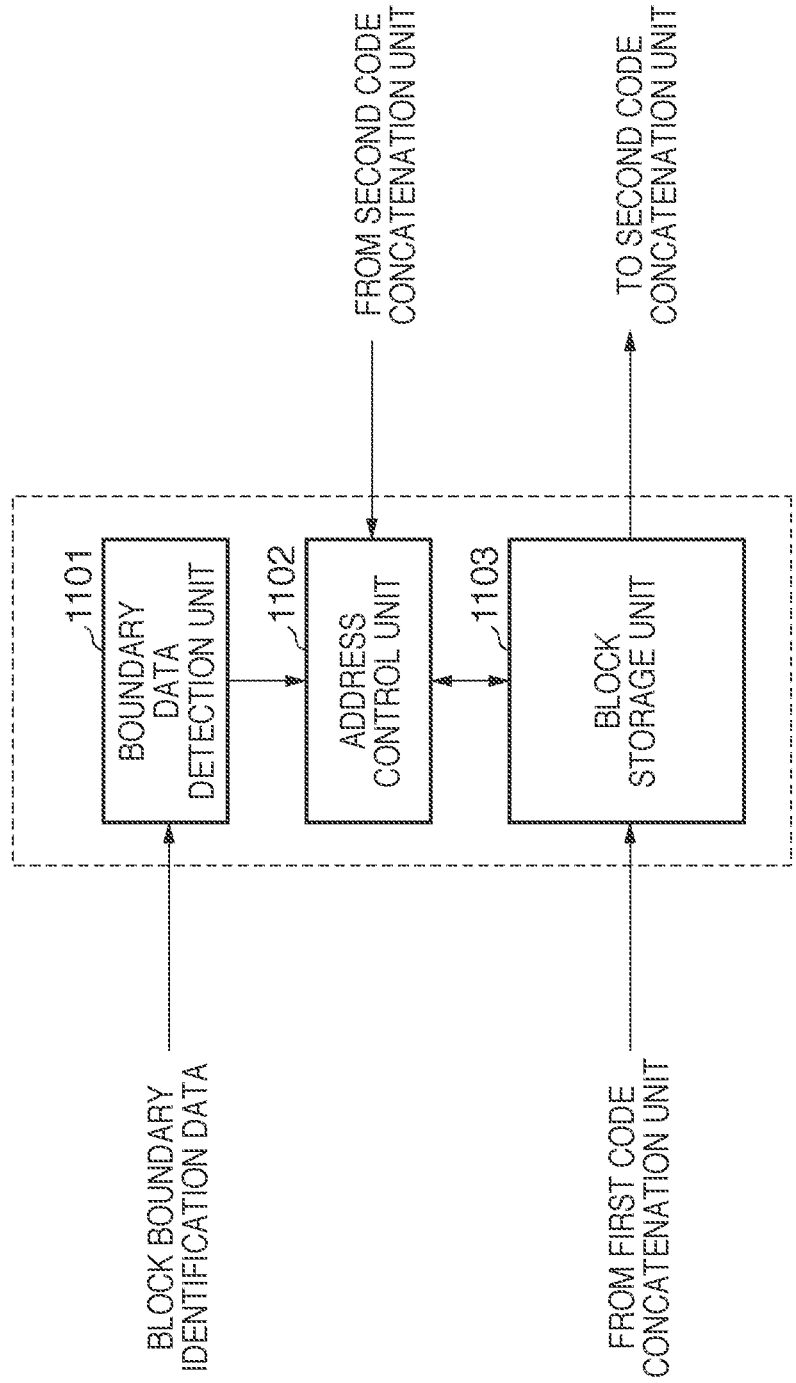
FIG. 11 is a block diagram showing the periphery of the block storage unit.

Described hereinafter is how a boundary of partial code streams for each block is detected, with reference to FIG. 11. A block storage unit 1103 corresponds to the block storage units 908 and 912 in FIG. 9. Since the configuration of the block storage unit 1103 is similar to that of the first embodiment, descriptions thereof are omitted herein. To a boundary data detection unit 1101, block boundary identification data (luminance data and color difference data of the coding target block, frequency component data, block address data in the MB, and so forth) are inputted, and based on the inputted data, a boundary of code streams for each block is detected. The detection result is used in the condition determination in S102 in FIG. 7.

An address controller 1102 controls input and output addresses of the block storage unit 1103 based on the detection result of the boundary data detection unit 1101. Further, when the boundary data detection unit 1101 detects a block boundary, the address controller 1102 separately stores information for identifying the address where the last partial code stream of the block is stored.

The second code concatenation unit 913 (FIG. 9) reads, in predetermined order, partial code streams of the block stored in the block storage units 908 and 912, concatenates them, and outputs a final code stream of an image. Since details of the second concatenation unit 913 is similar to that of the first embodiment, descriptions thereof are omitted herein.

Note that, FIG. 9 shows a configuration in which lower-bit data stored in the MB storage unit 910 is converted to fixed-length data by the fixed-length data generation units 914 and 915, and the fixed-length data are concatenated by the first code concatenation unit 911. However, the fixed-length data generation units 914 and 915 as well as the first code concatenation unit 911 may be provided before the MB storage unit 910 for storing partial code streams in the MB storage unit 910.

The above descriptions have provided an application of the present invention to a digital camera, and explained a case where the present invention is applied to the H.264 coding scheme and the JPEG XR coding scheme as the first and second embodiments. However, an application of the present invention is not limited to a digital camera. It is apparent that the present invention can be applied to other coding schemes. Furthermore, according to the present invention, generation means of each code inputted to the first code concatenation unit is not limited to the one described above. Moreover, it is also apparent that values N, M, K, and L in FIG. 1 are not limited to the values specified in the first and second embodiments. For instance, the first code concatenation unit 907 in FIG. 9 concatenates codes that are outputted by two codes generation units, that is, variable-length codes generation units 905 and 906. However, the present invention is applicable to a case of concatenating codes that are outputted by three or more codes generation units. Moreover, for instance, the first code concatenation unit 911 in FIG. 9 concatenates codes that are outputted by two codes generation units, that is, fixed-length data generation units 914 and 915. However, the present invention is applicable to a case of concatenating codes that are outputted by three or more codes generation units. Still further, all or part of the processing according to the present invention may be realized by software. Particularly, in a case of software, the processing units (e.g., syntax element generation units) arranged in parallel, which are shown in FIG. 1 or the like, may be realized as multithreading.

As has been set forth above, according to the above-described embodiments, it is possible to ensure independence of the processing performance of the codes generation unit and the processing performance of the code concatenation unit in accordance with the capacity of the block storage unit.

Furthermore, by dividing the code concatenation in two stages with the use of block storage units, processing performance of the first code concatenation unit is determined by the number of parallel of the codes generation units. In other words, it is possible to realize high-speed processing by increasing the number of parallel.

In the storage unit, partial code streams concatenated in block unit are stored. The second code concatenation unit can achieve high-speed processing in accordance with a storage capacity of the block storage unit, a reading data width of a partial code stream from the block storage means, and an output data width of a code stream. Therefore, code concatenation can be performed without depending on the number of syntax elements generated in the encoding process, and a high-speed image encoding apparatus can be realized.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2010-102689, filed Apr. 27, 2010, which is hereby incorporated by reference herein in its entirety.

What is claimed is:

1. An image coding apparatus for frequency-transforming a block constituting an image and generating a code stream based on an obtained transform coefficient, comprising:
   a plurality of codes generation units arranged in parallel, which are configured to generate codes, including one or more codes, based on the transform coefficient;
   a plurality of first code concatenation units arranged in parallel, each of which is configured to concatenate each code, constituting the codes generated by said codes generation units, for generating a partial code stream;
   a plurality of storage units arranged in parallel, each of which is configured to store the partial code stream inputted from said first code concatenation unit; and
   a second code concatenation unit configured to read the partial code stream, which is stored in each of said plurality of storage units, and concatenate read partial code streams for generating the code stream for output,
   wherein each of said storage units is configured with at least two memories for simultaneously outputting a last of partial code streams which is stored in one of said memories and a first of partial code streams which is to be concatenated next and stored in another of said memories.

2. The image coding apparatus according to claim 1, wherein said second code concatenation unit reads a partial code stream from one of said plurality of storage units, reads from another of said storage units a partial code stream from a storage unit storing the (k+1)th partial code stream which is to be concatenated next, concatenates the read partial code streams, and outputs a concatenated code stream.

3. The image coding apparatus according to claim 1, wherein each of said plurality of storage units stores the partial code stream in a predetermined area, and comprises a boundary data detection unit configured to identify a boundary of partial code streams, and
   said second code concatenation unit concatenates the partial code streams based on a detection result of said boundary data detection unit.

4. The image coding apparatus according to claim 1, wherein each of the at least two memories is configured to have at least one read port and one write port.

5. An image coding apparatus for frequency-transforming a block constituting an image and generating a code stream based on an obtained transform coefficient, comprising:
   a plurality of codes generation units arranged in parallel, which are configured to generate codes, including one or more codes, based on the transform coefficient;
   a plurality of first code concatenation units arranged in parallel, each of which is configured to concatenate each code, constituting the codes generated by two or more of said codes generation units, for generating a partial code stream;
   a plurality of storage units arranged in parallel, each of which is configured to store the partial code stream inputted from said first code concatenation unit; and
   a second code concatenation unit configured to read the partial code stream, which is stored in each of said plurality of storage units, and concatenate read partial code streams for generating the code stream for output
   wherein each of said storage units is configured with at least two memories for simultaneously outputting a last of partial code streams which is stored in one of said memories and a first of partial code streams which is to be concatenated next and stored in another of said memories.

6. The image coding apparatus according to claim 5, wherein said second code concatenation unit reads a partial code stream from one of said plurality of storage units, reads from another of said storage units a partial code stream which is to be concatenated next, concatenates the read partial code streams, and outputs a concatenated code stream.

7. The image coding apparatus according to claim 5, wherein each of said plurality of storage units stores the partial code stream in a predetermined area, and comprises a boundary data detection unit configured to identify a boundary of partial code streams, and
   said second code concatenation unit concatenates the partial code streams based on a detection result of said boundary data detection unit.

8. The image coding apparatus according to claim 5, wherein each of the at least two memories is configured to have at least one read port and one write port.

9. A control method of an image coding apparatus for frequency-transforming a block constituting an image and generating a code stream based on an obtained transform coefficient, comprising:
   a plurality of codes generation steps executable in parallel for generating codes, including one or more codes, based on the transform coefficient;
   a plurality of first code concatenation steps executable in parallel for concatenating each code, constituting the codes generated by said plurality of codes generation steps, generating a partial code stream, and storing the partial code stream in each of a plurality of storage units; and
   a second code concatenation step of reading the partial code stream, which is stored in each of the plurality of storage units, and concatenating read partial code streams for generating the code stream for output,
   wherein each of said storage units is configured with at least two memories for simultaneously outputting a last of partial code streams which is stored in one of said memories and a first of partial code streams which is to be concatenated next and stored in another of said memories.

10. A control method of an image coding apparatus for frequency-transforming a block constituting an image and generating a code stream based on an obtained transform coefficient, comprising:
- a plurality of codes generation steps executable in parallel for generating codes, including one or more codes, based on the transform coefficient;
- a plurality of first code concatenation steps executable in parallel, each of said steps concatenating each code, constituting the codes generated by two or more of said codes generation steps, for generating a partial code stream;
- a plurality of storing steps executable in parallel, each of said steps storing the partial code stream inputted from said first code concatenation step; and
- a second code concatenation step of reading the partial code stream, which is stored in each of a plurality of storage units as a result of the plurality of storage steps, and concatenating read partial code streams for generating the code stream for output, wherein each of said storage units is configured with at least two memories for simultaneously outputting a last of partial code streams which is stored in one of said memories and a first of partial code streams which is to be concatenated next and stored in another of said memories.

11. A non-transitory computer-readable storage medium, which stores a program for having a computer read and execute the program, thereby causing the computer to execute respective steps of said method described in claim 9.

12. A non-transitory computer-readable storage medium, which stores a program for having a computer read and execute the program, thereby causing the computer to execute respective steps of said method described in claim 10.

\* \* \* \* \*